United States Patent [19]

Kemp, Jr.

[11] Patent Number: 4,861,319
[45] Date of Patent: Aug. 29, 1989

[54] SPEED REDUCTION DRIVE

[75] Inventor: Dennis E. Kemp, Jr., Maplewood, N.J.

[73] Assignee: Mark T. Basseches, Pleasantville, N.Y.; a part interest

[21] Appl. No.: 292,919

[22] Filed: Jan. 3, 1989

[51] Int. Cl.⁴ .............................................. F16H 7/06
[52] U.S. Cl. ...................................... 474/69; 474/156
[58] Field of Search ............................ 474/155–160, 474/69–72; 74/7 R, 7 E

[56] References Cited

U.S. PATENT DOCUMENTS 3,678,771  7/1972  Burch ..................................... 474/69
3,726,158  4/1973  Brown ............................ 474/156 X
4,261,214  4/1981  Watanable et al. ................. 474/156

Primary Examiner—Thuy M. Bui
Attorney, Agent, or Firm—Mark T. Basseches; Paula T. Basseches

[57] ABSTRACT

A speed reduction drive is comprised of a chain carrying a plurality of rollers, the chain being operatively connected to an output shaft via a sprocket or the like. The rollers of the chain progressively pass between a rotating drive pinion and a stator surface whereby the chain is driven at a linear speed which is a function of the diameter of the drive pinion and the arcuate surface of the stator, the speed of the chain being reduced by differential drive effects.

7 Claims, 2 Drawing Sheets

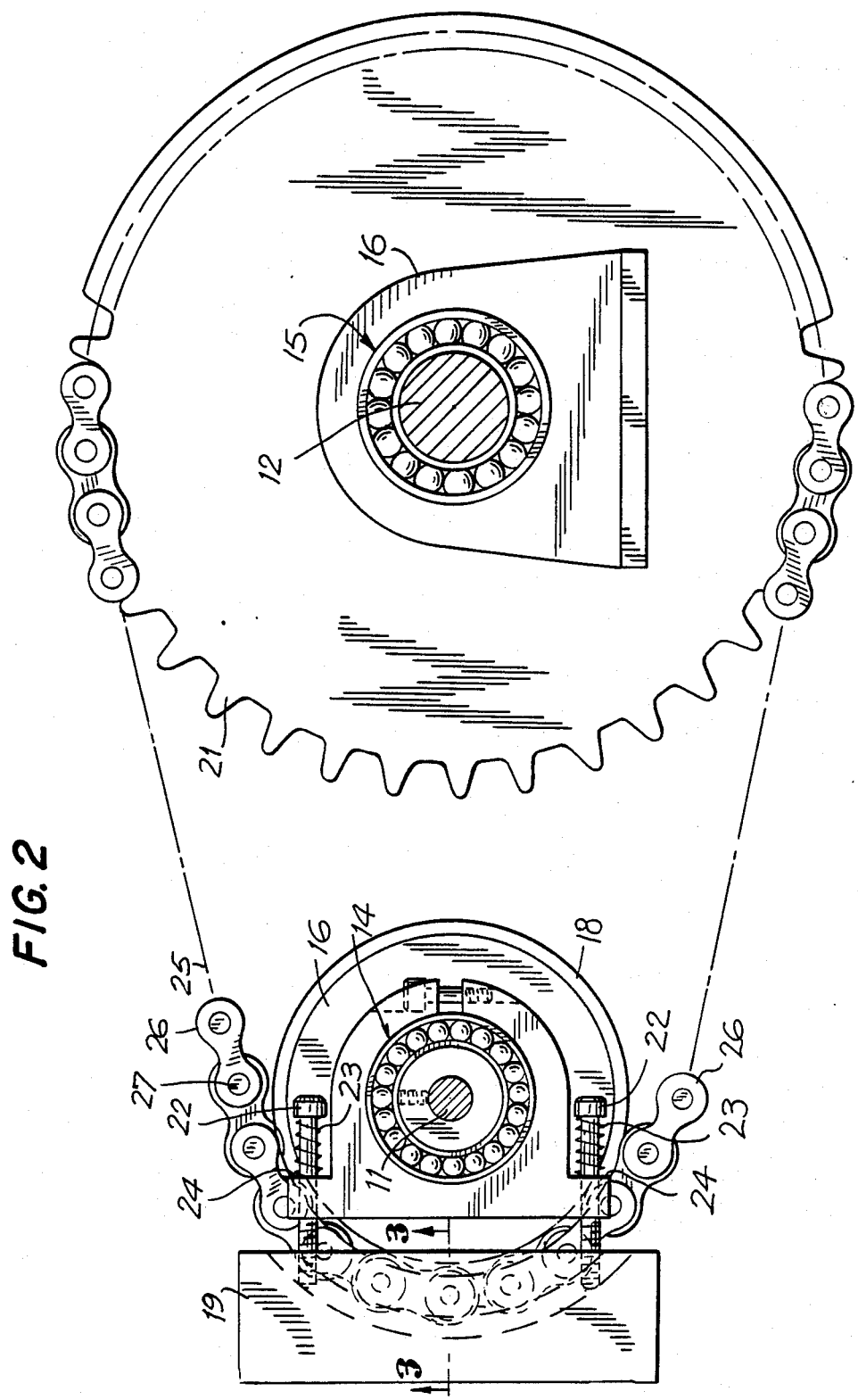

SPEED REDUCTION DRIVE

BACKGROUND OF THE INVENTION

1. Field of the Invention

The present invention is in the field of industrial speed reduction drives and relates more particularly to a compact and cost efficient rotary speed reduction drive.

2. Prior Art

Conventional rotary speed reducers for industrial application include, in general, chain and sprocket drives, and belt and pulley or sheave drives. Both of the noted drive types have limited speed reduction capabilities when used with a single belt or chain flight.

Specifically, it is generally recognized that for significant transmission of torque a limitation of about 3:1 to 4:1 ratio is about the maximum which may be practicably employed. This limitation is engendered in part by the fact that in a sprocket only a limited number of teeth of the driving sprocket will engage the chain and, thus, there is a limit to the stress which may be applied to such small proportion of the sprocket teeth.

Similarly, there are limitations on the minimum radius of pulley to which a belt may be adapted since excessive flexing results in premature cracking and belt wear, thus mandating the use of relatively large drive pulleys and accordingly substantially larger output pulleys. In order to achieve, with a belt and pulley or chain and sprocket drive, speed reductions in excess of about 4:1 it is mandatory to use multiple sets of belts or chains, with resultant cost increases due to the necessity for providing additional shafts and bearings therefor. Moreover, the use of speed reducers which incorporate three or more shafts increases the bulk of the speed reducing unit.

Gear reduction drives suffer from the same disadvantage noted above and, in addition, are inherently more expensive than chain or belt drives due to the machining operation and metal treatment operation associated with gear manufacture plus the additional cost of lubricant encasing housings. The limitations of various reduction drives are well known in the industry and need not be further discussed.

It is known to provide, for specialized drive uses, planetary gear reduction units wherein a drive gear drives planetary gears which are meshed in addition with a stator gear to drive an output shaft connected to the planets. Such devices are extremely expensive due to the multiplicity of gears and bearings involved, the precision with which the same need be constructed, inherent high cost of gear fabrication, etc.

SUMMARY OF INVENTION

The present invention may be summarized as directed to a planetary chain speed reduction device which is inexpensive to manufacture, durable, compact and capable of producing high speed reduction ratios.

More particularly, the invention is directed to a speed reduction device comprising an input drive pinion or roller, a stator surface co-axially located in spaced relation to the pinion and a chain having planetary rollers biased into frictional engagement with the stator and pinion surfaces.

The resultant speed reducer achieves a reduction which is the combined result of the reduction in linear speed of the chain and the reduction achieved as a result of the chain flight driving a sprocket or larger diameter than the pinion.

The linear speed of the chain which is reduced by the differential action resulting from the interplay of the pinion, planet rollers and stator may be decreased by a factor of 4:1 or more whereby, through the use of an appropriately sized sprocket, a two shaft unit may efficiently achieve a speed reduction of up to about 16:1 or more.

Due to the nature of the apparatus, great precision is not required in its manufacture and advantageously, the planets carried by the chain and/or the pinion and stator surfaces may be formed of elastomeric materials or pneumatically inflated elastomeric members to assure high friction and consequently high torque transmission, long life and low cost.

Accordingly, it is an object of the invention to provide for inexpensive, effficient and compact rotary speed reducer device which is capable of high ratios of speed reduction.

BRIEF DESCRIPTION OF THE DRAWINGS

FIG. 2 is a front elevational view thereof;

DETAILED DESCRIPTION OF THE DRAWINGS

Figure 1:
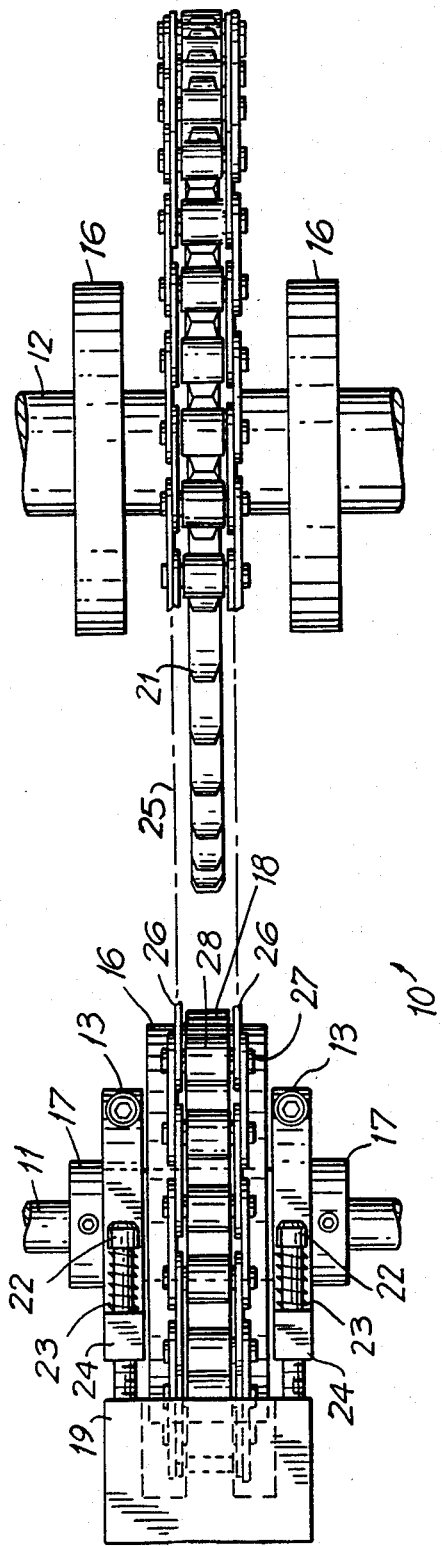
FIG. 1 is a top plan view of a speed reduction device in accordance with the invention.
Figure 4:
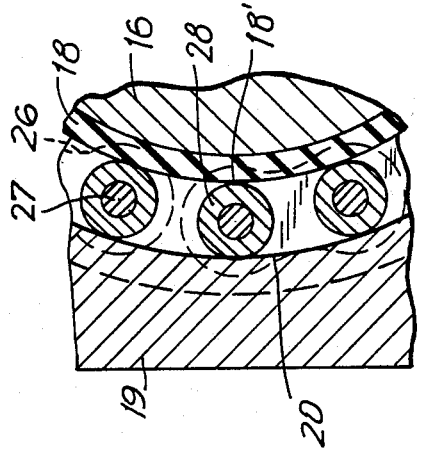
FIG. 4 is a vertical section of the line 4—4 of FIG. 3.

Referring now to the drawings, there is disclosed in semi-diagrammatic fashion a speed reduction device 10 in accordance with the invention.

The reduction device includes an input drive shaft 11, and an output drive shaft 12. The input drive shaft is supported on a spaced pair of pillow blocks 13. The shaft 11 is mounted in bearing assembly 14, the outer race of which is fixed to the pillow blocks.

In similar fashion, output shaft 12 is supported through the medium of bearing assembly 15 in pillow blocks 16 which are fixed to a frame (not shown). A driving pinion 16 is keyed to shaft 11, as by collars 17, the shaft being driven by an external prime mover.

The drive pinion includes a drive rim which projects radially beyond the surface of the pinion. The drive rim 18 may be comprised of a compressible elastomeric substance with or without an annular pneumatic interior chamber.

A stator assemble 19, which is likewise mounted to the frame, is proximatel spaced from the drive pinion 16. The stator includes an arcuate drive surface 20 which is coaxially aligned as respects the axis of shaft 11 and periphery 18' of drive rim 18. Output shaft 12 is keyed to output sprocket 21.

The pillow blocks 13, 13 are yieldably urged toward stator 19 as by four adjustment bolts 22 threaded into the stator block 19, four spring members 23 being biased between the under-surface of the heads of bolts 22 and flanges 24 formed on the pillow blocks.

As will be understood from the foregoing description, the pillow blocks are urged toward the stator 19 with a variable yieldable force which is a function of the adjusted position of bolts 22.

A roller chain 25 which is engaged with sprocket 21 is interposed between stator block 19 and the drive rim 18' of the drive pinion 16. More specifically, the chain 25 which may comprise a readily available "off the shelf" item is comprised of spaced links 26, 26 spanned by roller support shafts 27, the roller support shafts each rotatably carrying a planet roller 28.

Figure 3:
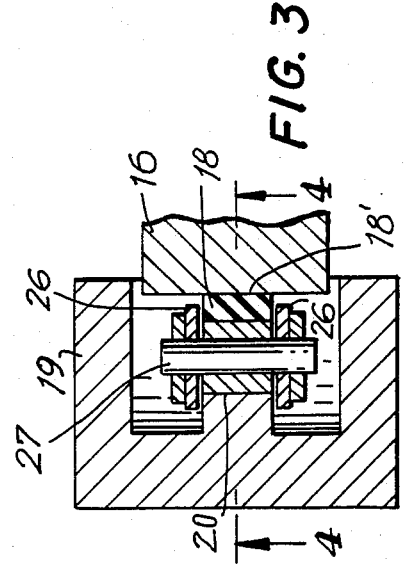
FIG. 3 is a fragmentary magnified horizontal section taken on the line 3—3 of FIG. 2.

As best seen from FIG. 3, the drive rim 18' intrudes between the spaced links 26 and is biased by springs 23 against the external peripheries of the rollers 28, the opposite surface of a number of such rollers 28 being biased against the drive surface 20 of the stator. Alternately, the roller chain may include rollers of a diameter larger than the links 26, and in this case the drive pinion includes an annular drive groove spanning the peripheries of the rollers 28.

The operation of the device and the manner of its functioning will now be described. However, in advance of describing such operation it should be appreciated that since the driving forces which serve to move the chain 25 are frictionally applied, advantageously one or more of the surfaces of the planet rollers, drive rim 18 and/or drive surface 20 of the stator may be comprised of elastomeric materials. To maximize the driving force and minimize slippage, the planet rollers, for instance, may be comprised of pneumatically inflated tires, the rollers in the drawings being shown for simplicity of illustration merely as cylinders. The apparatus will of course function where all of the interengaging driving components are comprised of metal, etc.

When a rotary force is applied to shaft 11, the drive rim 18' of pinion 16 causes rollers 28 to rotate and hence rollingly traverse the surface 20 of stator 19.

Due to differential effects, the axis of the roller 28 will advance at a linear speed which is one half the linear speed of the circumference of the drive surfaces 18' of the pinion 16, the actual speed of advance of the chain being a function of the ratio of the diameters of the pinion and rollers 28.

The output speed of the shaft 12 will in addition, be a function of the size of the sprocket 21 whereby it will be appreciated that the speed reduction achieved is a function of the reduced linear speed of the chain as compared with the peripheral speed of the pinion and the speed reduction achieved as a result of driving a sprocket of larger diameter than the input pinion roller. This is in contrast to a conventional sprocket drive wherein the speed reduction is a function solely of the ratio of the sizes of the sprockets.

In high torque application of shaft 12 it may be desirable to increase the transverse dimension of the pinion, the planets and surface of the stator engaged by the planets to maximize the contact areas of the respective parts.

The use of elastomeric or pneumatic elastomeric surfaces of increase friction in the interengaging components of the pinion, planet rollers and stator surface is desirable in certain uses, although with appropriate yieldable forces between the relatively moving components little or no slippage is encountered.

A further control of the amount of torque transmitted may be effected by the force with which the planets are compressed between the pinion and stator.

While the illustrated embodiment discloses a force adjustment effected by compression springs, it will be appreciated that pneumatic or hydraulic means, such as a piston and cylinder arrangement to achieve the desired compression, provides a viable alternative.

In the illustrated embodiment the stator is depicted as fixed and the pinion yieldably urged toward the stator surface. It will be readily recognized, however, that in instances where the prime mover is fixed mounted it may be desirable for the pinion axis to be fixed relative to the frame or housing of the reduction unit and the stator urged toward the fixedly located pinion axis.

From the foregoing, it will be appreciated that there is disclosed in accordance with the invention a speed reduction drive wherein large ratios of speed reduction may be achieved in a compact mechanism. Obviously, if extremely great ratios of speed reduction are required, it is contemplated that, for example, shaft 12 may itself drive a further speed reducing device in accordance with the invention, or a conventional further speed reducing device.

A further advantage of the instant speed reducer resides in the fact that in the event of a jamming or stalling of the driven apparatus there exists the possibility of slippage within the speed reduction device to avoid or minimize damages in the more expensive driven device.

The speed reduction apparatus of the invention has the additional advantage of being capable of employing commercially available roller chains as the planetary roller components.

Numerous variations in details of contruction may occur to those skilled in the art and familiarized with the instant disclosure. Accordingly, the invention is to be broadly construed within the scope of the appended claims.

I claim:

1. A speed reduction drive for connection to an input shaft comprising a drive roller mounted for rotation about a first axis, a chain having links and a plurality of rollers supported on said links for rotation about an axis parallel to said first axis, the periphery of a plurality of said rollers engaging said drive roller, a sprocket member meshed with said chain, a stator having an arcuate surface co-axial with said first axis engaging the periphery of a plurality of said rollers, said rollers being in frictional driving connection with said drive roller and said surface of said stator whereby said chain is driven at a linear speed less than the linear speed of the periphery of said drive.

2. Apparatus in accordance with claim 1 and including biasing means interposed between said drive roller and said stator for yieldable compressing said plurality of rollers between said surface of said stator and said drive roller.

3. Apparatus in accordance with claim 2 wherein said stator is mounted for movement toward and away from said drive roller, said biasing means including spring means urging said stator toward said drive roller.

4. Apparatus in accordance with claim 3 wherein said chain comprises parallel pairs of links, said plurality of rollers being mounted between the links of said pairs, said drive roller including a projecting rim entering between said pairs of links and engaging said peripheries of said plurality of rollers.

5. Apparatus in accordance with claim 4 wherein said arcuate surface of said stator is disposed between said links of said chain.

6. Apparatus in accordance with claim 1 wherein at least one of said drive roller, said plurality of rollers and said arcuate surface is comprised of a high friction resilient elastomeric material.

7. Apparatus in accordance with claim 6 wherein said frictional driving connection between said plurality of rollers and said stator and drive roller respectively results, at least in part, from compression of said elastomeric material.

* * * * *